US010334945B2

(12) United States Patent
Kogon

(10) Patent No.: US 10,334,945 B2
(45) Date of Patent: Jul. 2, 2019

(54) MODULAR RACK FOR PHYTOCHEMICAL EXTRACTION SYSTEM

(71) Applicant: Boris David Kogon, Seattle, WA (US)

(72) Inventor: Boris David Kogon, Seattle, WA (US)

( * ) Notice: Subject to any disclaimer, the term of this patent is extended or adjusted under 35 U.S.C. 154(b) by 0 days.

(21) Appl. No.: 15/882,977

(22) Filed: Jan. 29, 2018

(65) Prior Publication Data
US 2018/0213930 A1 Aug. 2, 2018

Related U.S. Application Data

(63) Continuation-in-part of application No. 15/339,380, filed on Oct. 31, 2016, now Pat. No. 9,877,581.

(60) Provisional application No. 62/373,284, filed on Aug. 10, 2016, provisional application No. 62/360,737, filed on Jul. 11, 2016.

(51) Int. Cl.
A47B 47/00 (2006.01)
A47B 81/00 (2006.01)
B01D 11/00 (2006.01)
A47F 5/13 (2006.01)
A47B 47/02 (2006.01)

(52) U.S. Cl.
CPC .......... *A47B 47/0091* (2013.01); *A47B 81/00* (2013.01); *A47F 5/137* (2013.01); *B01D 11/00* (2013.01); *A47B 47/027* (2013.01); *A47B 47/028* (2013.01)

(58) Field of Classification Search
CPC ... A47B 45/00; A47B 47/0091; A47B 81/007; A47B 81/00; A47B 47/027; A47F 5/137; B01D 11/00

USPC ....................................................... 211/13.1
See application file for complete search history.

(56) References Cited

U.S. PATENT DOCUMENTS

| 650,663 | A | | 5/1900 | Whitcher |
| 2,830,779 | A | * | 4/1958 | Wentling ............... F04D 29/646 248/137 |
| 3,405,894 | A | * | 10/1968 | Jordan ..................... E02F 3/64 248/125.3 |
| 3,938,267 | A | | 2/1976 | Bard |
| 4,630,459 | A | | 12/1986 | Elliott |
| 4,968,177 | A | | 11/1990 | Bechtold |
| 5,556,065 | A | * | 9/1996 | Wadley ................ A61M 5/1415 248/129 |
| 5,975,389 | A | | 11/1999 | Braun et al. |
| 5,987,789 | A | | 11/1999 | Lubina |
| 6,029,633 | A | | 2/2000 | Yeh |
| 7,270,339 | B2 | | 9/2007 | Feick |
| 9,051,696 | B1 | | 6/2015 | Coats et al. |
| 9,526,236 | B2 | | 12/2016 | Coker |

* cited by examiner

Primary Examiner — Ko H Chan
(74) Attorney, Agent, or Firm — Benedict R. Dugan; Lowe Graham Jones PLLC

(57) ABSTRACT

A modular rack for mounting components of a phytochemical extraction system is described. The module rack includes at least two legs and one or more frame modules that are each at least 2 units in length. Multiple frame modules can be combined to create racks of width N, where N is an integer greater than 2 units in length. Each frame module may also include mounting devices configured to removably attach extraction columns to the frame module.

15 Claims, 7 Drawing Sheets

MODULAR RACK FOR PHYTOCHEMICAL EXTRACTION SYSTEM

PRIORITY CLAIM

This application is a continuation-in-part of U.S. patent application Ser. No. 15/339,380, entitled "MODULAR RACK FOR PHYTOCHEMICAL EXTRACTION SYSTEM," filed on Oct. 31, 2016; which claims the benefit of priority from U.S. Provisional Patent Application No. 62/360,737, entitled "SOLVENT DEPRESSURIZATION DEVICES, SYSTEM, AND METHODS," filed on Jul. 11, 2016; and U.S. Provisional Patent Application No. 62/373,284, entitled "EXTRACTION COLUMN FOR A PHYTOCHEMICAL EXTRACTION SYSTEM," filed on Aug. 10, 2016, the contents of which applications are incorporated herein by reference in their entireties.

TECHNICAL FIELD

The present disclosure relates to a modular rack for mounting components of a phytochemical extraction system.

BACKGROUND

Typical phytochemical extraction systems include multiple devices, vessels, columns, containers, and the like. Such items are used to hold solvents, coolants, material, and the like. Some of these items may be mounted to a rack or other structure to hold them in fixed positions while they are employed as part of an extraction process.

Prior art frame designs are static and non-adjustable. The number of columns on the rack, and the size of the rack, are fixed, and this limits the freedom one has to rearrange the machine that hangs on it. In addition, prior art racks typically employ hangers to mount columns. Each hanger requires a pair of wing-nuts or bolts to open and close. These will often fall on the ground and get lost. The inventive modular rack disclosed herein addresses these shortcomings.

BRIEF DESCRIPTION OF THE DRAWINGS

FIGS. 5A-5C are perspective, front, and side views of a frame module according to one embodiment.

DETAILED DESCRIPTION

Embodiments described herein provide a modular rack for mounting components of a phytochemical extraction system. As will be discussed further below, the inventive rack provides a foundation that is modular and flexible. The modular rack comprises separate leg segments combined with one or more frame portions. Each frame portion holds either two or three columns. When two legs and one or more frame segments are attached to one another, a rack having an integral width $N \geq 2$ can be formed. For example, a frame portion of length 2 feet and a frame portion of length 3 feet can be combined with two legs to form rack of width 5 feet. Long spans and/or heavy loads can be accommodated by adding an additional (e.g., third, fourth) leg segment between two frame portions.

The described rack also provides an improved, easy to use, and stable structure for connecting columns to the rack. The described rack replaces the fasteners (e.g., bolts, wing nuts) associated with hanger-based systems with a pair of compression collets, which are retained on the frame when the column is removed. The described rack thus reduces the action required to mount/de-mount each column to the loosening and tightening of two large nuts. The fastening system is described in more detail with reference to FIGS. 6A and 6B, below.

Figure 1:
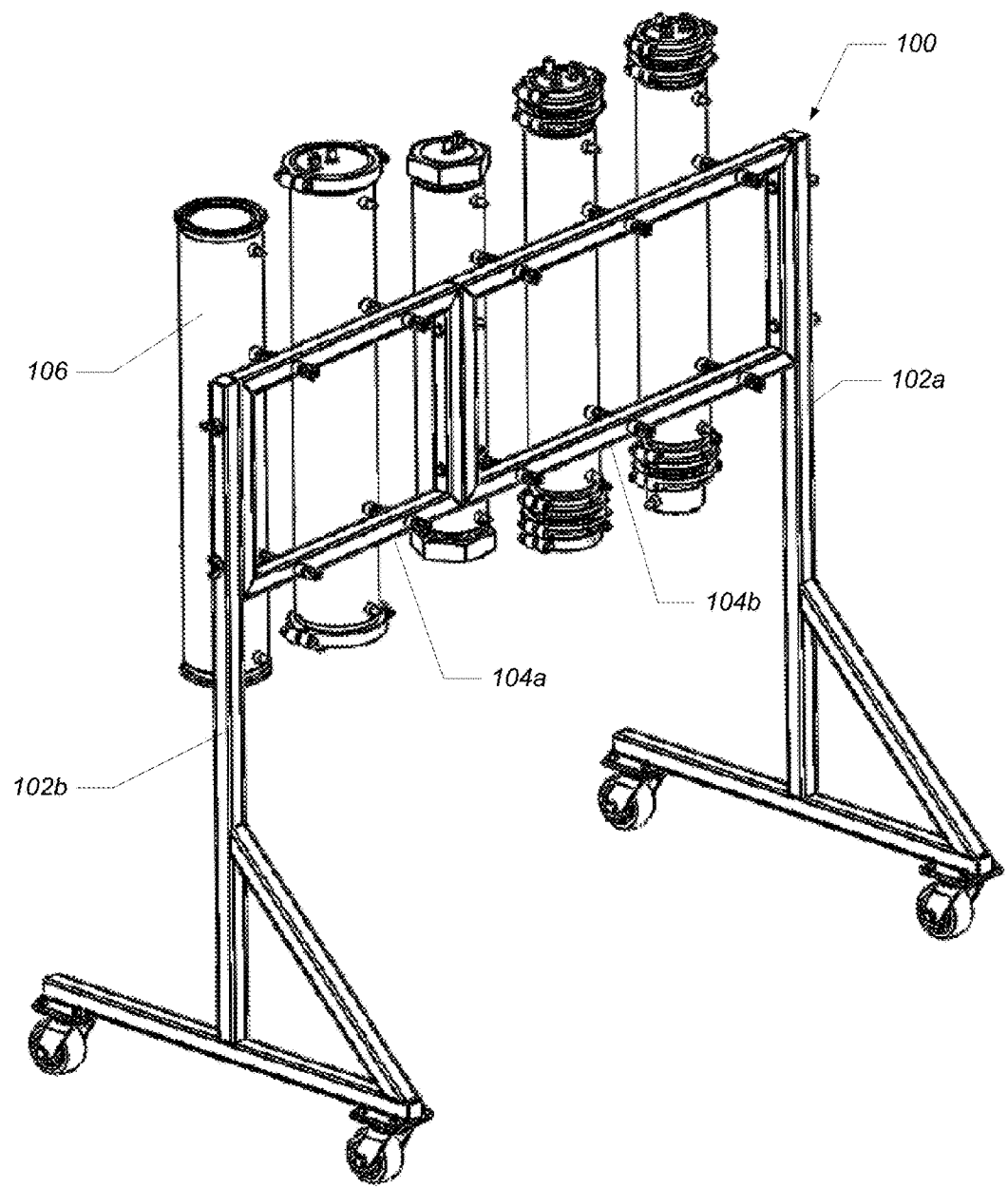
FIG. 1 is a first view of a modular rack according to one embodiment.

FIG. 1 is a first view of a modular rack according to one embodiment. FIG. 1 depicts a modular rack 100 that carries five extraction and recovery columns 106 as part of a phytochemical extraction system. The rack 100 includes a first leg 102a, a second leg 102b, a first modular frame 104a, and a second modular frame 104b. In the illustrated embodiment, the legs and frames are manufactured from steel or other metal tubing. Non-metal implementations are also possible.

Each of the legs 102a and 102b comprise a vertical member, a horizontal member, a diagonal member, and two casters. Typical embodiments have only a single diagonal support member for each leg, which improves lateral accessibility to the columns 106 and/or other devices attached to the rack 100. Example columns are shown and described in U.S. Provisional Patent Application No. 62/373,284, entitled "EXTRACTION COLUMN FOR A PHYTOCHEMICAL EXTRACTION SYSTEM," filed on Aug. 10, 2016.

Each of the frames 104a and 104b are rectilinear in shape. Each of the frames 104a and 104b are removably attached on each side either to the other frame or to one of the legs 102a or 102b. Through-bolts (e.g., one-half inch, 12 mm) are used to attach the frames in the illustrated embodiment. Various other attachment mechanisms are contemplated.

The rack 100 can be configured to provide an attachment surface of varying width, by utilizing multiple modular frames. In the illustrated embodiment, frame 104a has a width of 2 units, while frame 104b has a width of 3 units. The total width of the rack 100 is thus 5 units. A unit may be defined as a measure of distance, such as 1 unit=1 foot. By utilizing one or more modular frames, a user may configure the rack 100 to take on different total widths. For example, where modular frames can have widths of 2 or 3 units, the rack 100 can be configured to have any integral total width $N \geq 2$. The maximum total rack width of a rack is limited by the strength of the through bolts that connect frames to each other and the legs. While the strength of the bolts will vary with the exact bolt material, dimensions, and thread spacing, a typical one-half inch bolt has a pull-out strength measured in the tens of thousands of pounds. In practice, an extra leg section can be inserted mid-span or every five or six feet of run. A six foot run supports 6 columns per side. Additionally, longer runs can be broken up into individual stand-alone sections, with legs at each end.

In general, if a modular frame has a width of W units, the total rack width is expressed as $N=M*W$, where M is the number of modular frames employed, and W is the width of a frame module. As discussed, modular frames of differing widths can be used. For example, given modules of width $W_1$ and modules of width $W_2$ ($W_1 \ne W_2$), the total rack width can be expressed as $N=M_1*W_1+M_2*W_2$.

The described modular rack provides numerous benefits. First, as discussed above, it can be configured to take on different total widths, thereby adapting to particular applications or environments. Second, the frame can be readily disassembled and collapsed for storage or shipment.

Figure 2:
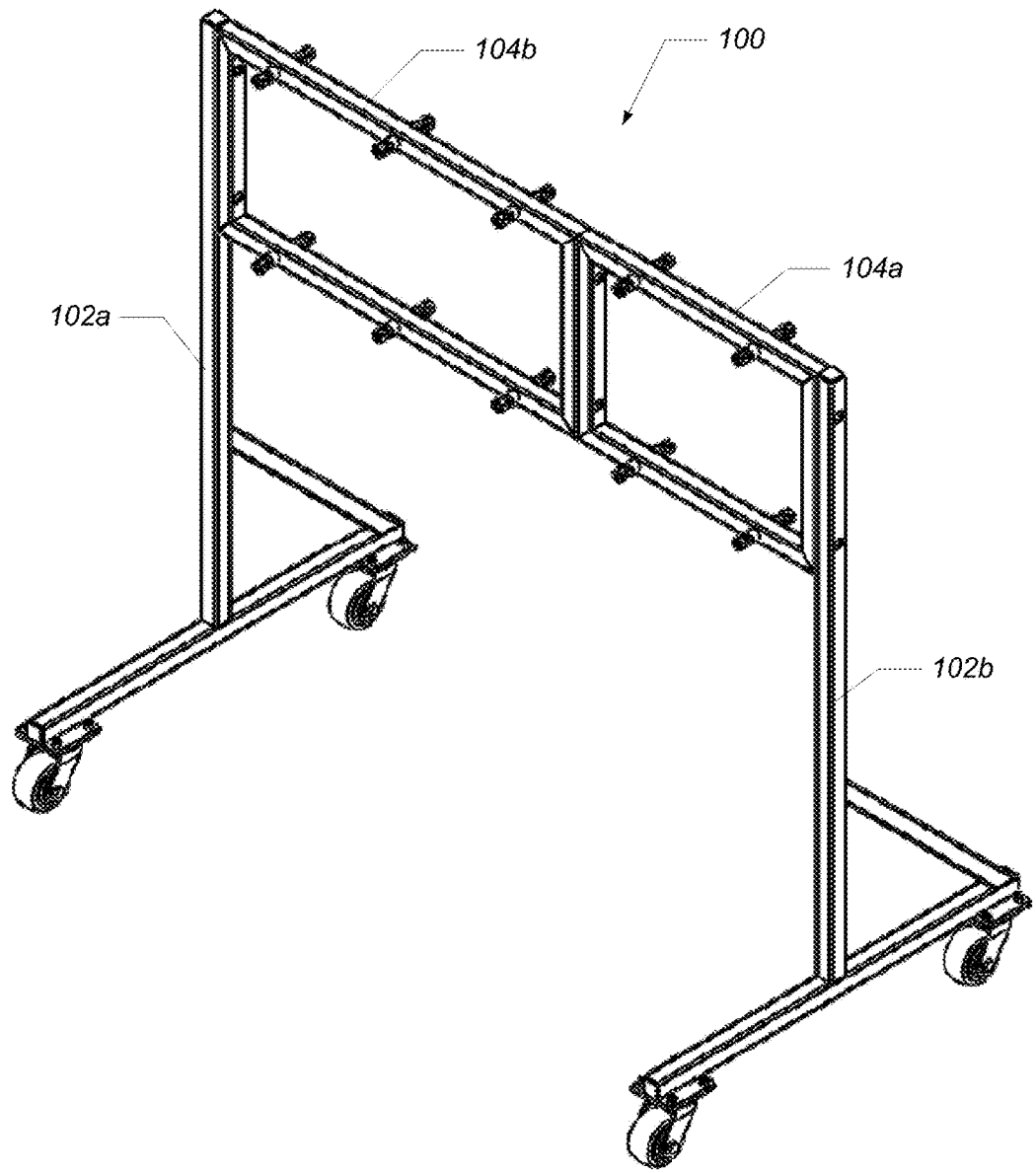
FIG. 2 is a second view of a modular rack according to one embodiment.

FIG. 2 is a second view of a modular rack according to one embodiment. In this view, the rack 100 is shown without the attached extraction columns 106.

Figure 3A:
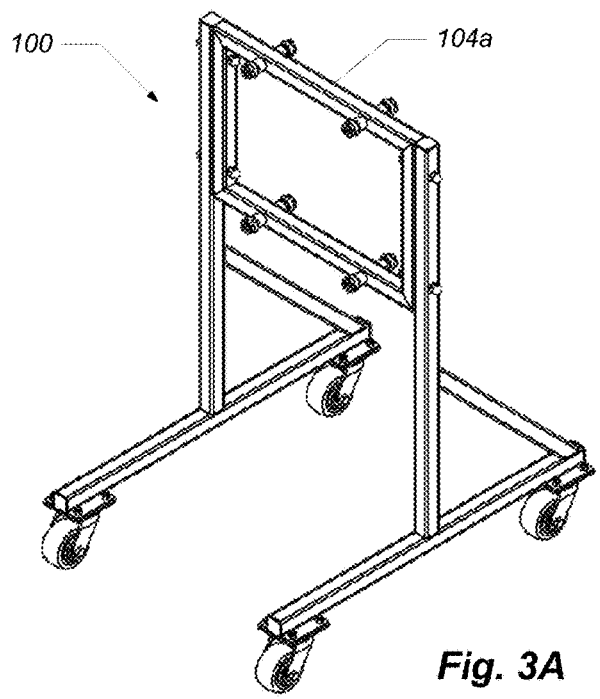
FIGS. 3A-3C are perspective, front, and side views of a modular rack.
Figure 3B:
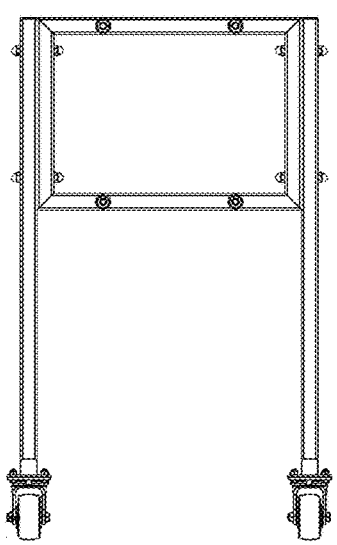
Figure 3C:
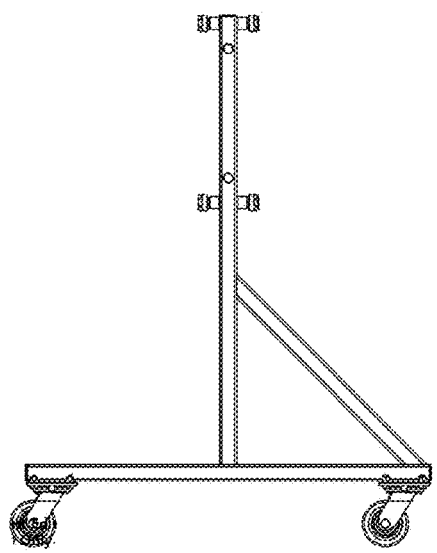

FIGS. 3A-3C are perspective, front, and side views, respectively, of a modular rack 100. Rack 100 is here configured to use only a single modular frame 104a having a width of 2 units.

Figure 4A:
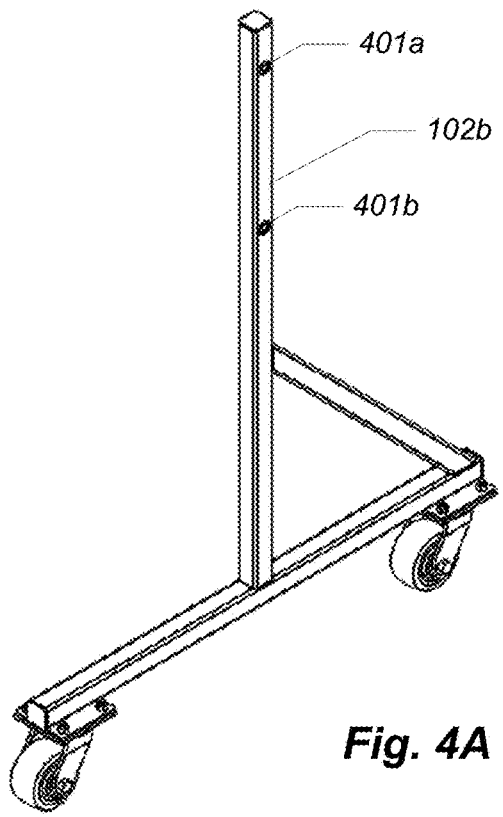
FIGS. 4A-4C are perspective, front, and side views of a support leg according to one embodiment.
Figure 4B:
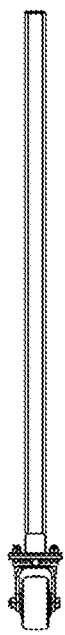
Figure 4C:
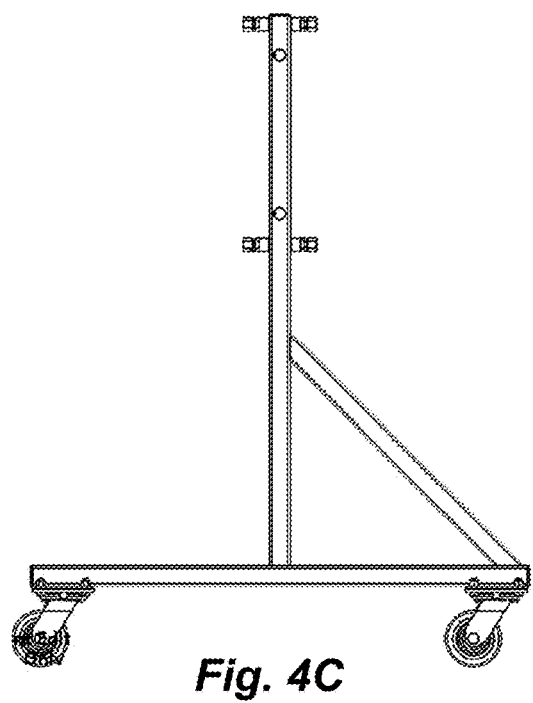

FIGS. 4A-4C are perspective, front, and side views, respectively, of a support leg 102b according to one embodiment. The support leg 102b is constructed from three sections (horizontal, diagonal, and vertical) of steel structural square tube. The vertical member is welded at one end to about the midpoint of the horizontal member, in a perpendicular arrangement. The diagonal brace member provides structural rigidity and is welded at its ends to the horizontal member and the vertical member.

The vertical member of the leg 102b includes holes 401a and 401b. As will be discussed further below, these holes facilitate attachment to a frame module.

Figure 5B:
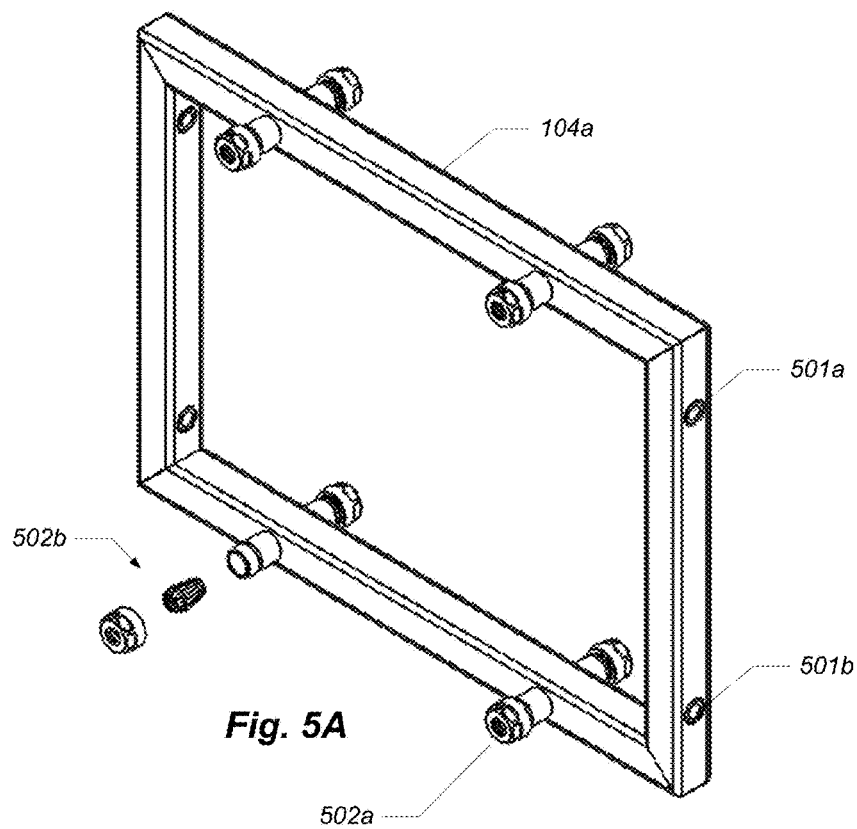
Figure 5B:
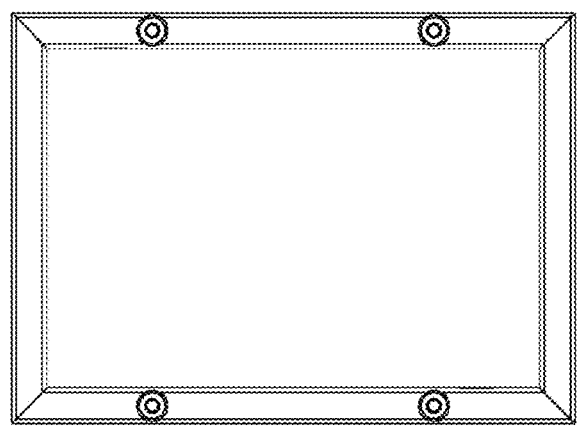
Figure 5C:
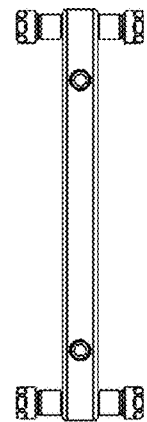

FIGS. 5A-5C are perspective, front, and side views of a frame module 104a according to one embodiment. The frame module 104a has a width of 2 units. The frame module 104a is constructed from four sections of steel structural square tube, welded at the corners.

The frame module 104a also includes holes 501a and 501b. These holes facilitate attachment to a support leg, or to another frame module. For example, the module 104a may be attached to leg 102b (FIG. 4A) by way of a first bolt that passes through holes 501a and 401a (of leg 102b) and a second bolt that passes through holes 501b and 401b (of leg 102b).

The frame module 104a also includes attachment devices 502a and 502b for extraction columns or other devices. Attachment device 502b is shown in exploded configuration. Attachment devices are described in additional detail with respect to FIGS. 6A and 6B, next.

Figure 6A:
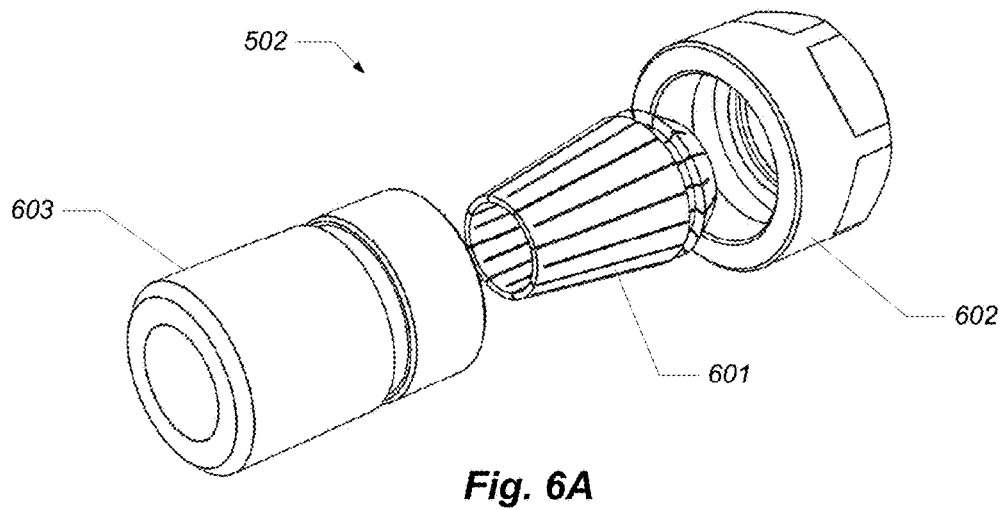
FIGS. 6A and 6B are perspective views of attachment devices configured to attach an item to a frame module.
Figure 6B:
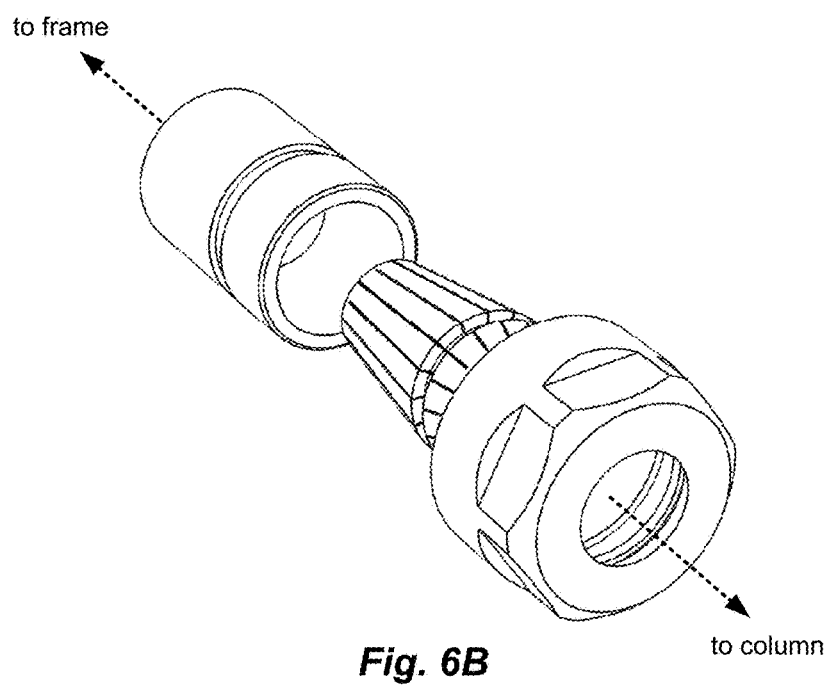

FIGS. 6A and 6B are perspective views of the attachment devices introduced with respect to FIG. 5A, above. Each attachment device 502 includes a collet 601 that clamps onto a corresponding steel pin that is welded onto each column. A collet is a segmented band or sleeve that is put around a spindle or shaft and tightened so as to grip the shaft. The collet sleeve has a conical shape, which is compressed into a conical housing 603 as a nut 602 is tightened. When the nut is loosened, it impinges on a shelf on the mounting pin, breaking internal friction to push it out. The exploded view of attachment device 502 illustrates how the nut 602 encloses the perforated collet 601 and compresses it into the receiving housing 603, which is welded to the frame 104.

Figure 7:
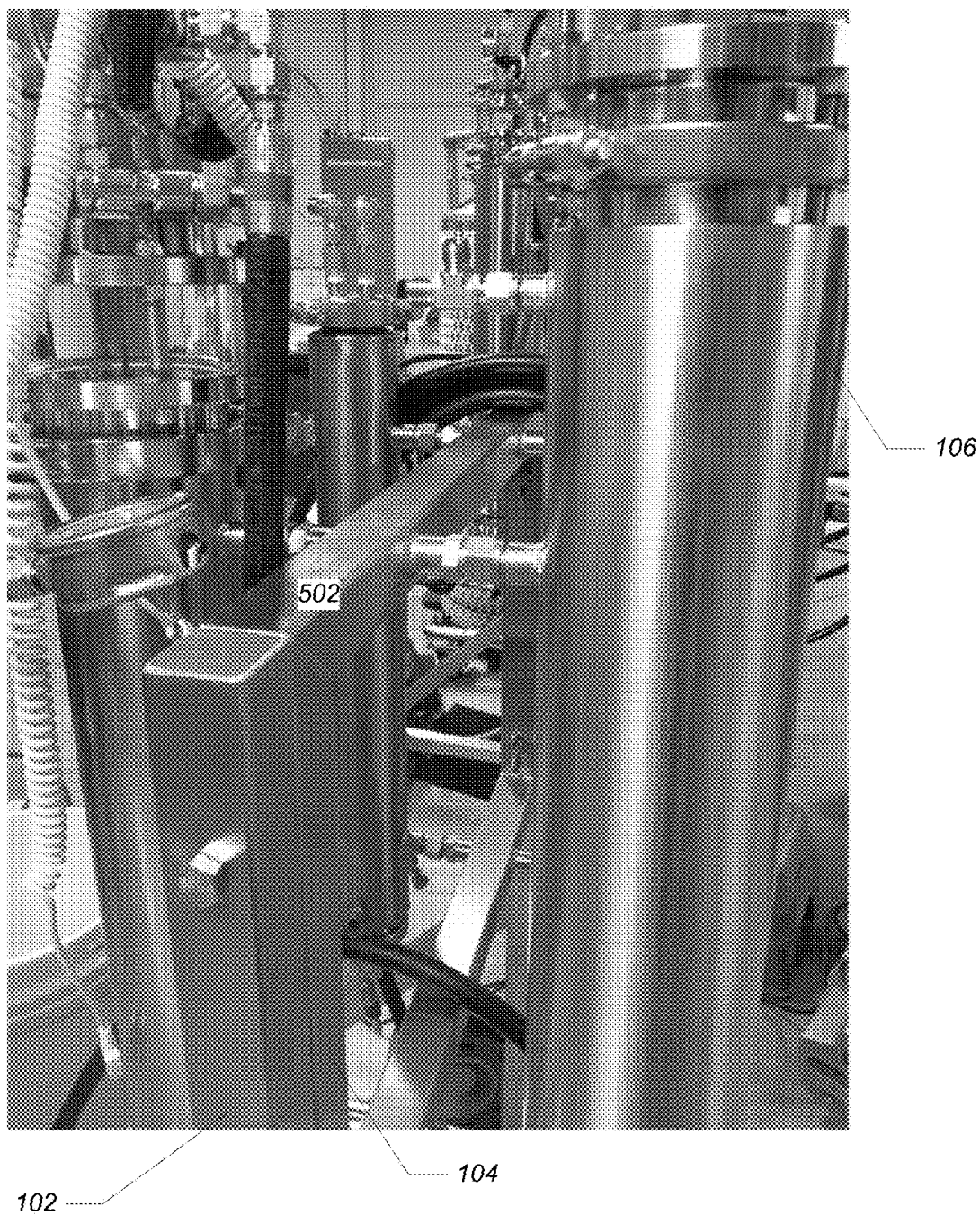
FIG. 7 is a photograph which shows a detailed view of a column attached to a frame via an attachment device according to one embodiment.

FIG. 7 is a photograph which shows a detailed view of a column attached to a frame via an attachment device according to one embodiment. In the photograph, a leg 102 is shown attached to a frame module 104, and a column 106 is shown attached to the frame module 104 via an attachment device 502.

Other embodiments may use attachment devices of other types or structures. For example, one embodiment may use a c-clamp to grasp the steel pin of the column The c-clamp is tightened with a screw/nut combination or a quick-release lever lock. In another embodiment the pin is threaded stock which passes through a horizontal hole in the bar stock, and which is then secured by way of a nut on the back side of the frame.

In another embodiment, rather than a steel pin, a flat plate member is welded to the column. The flat surface of the plate is arranged perpendicular to the long axis of the column, such that it rests on top of the bar stock of the frame. The plate and frame each have a hole. The holes can be aligned so that a through bolt can pass vertically through and connect the plate to the frame. The bolt is then secured by way of a nut or similar fastener. Instead of a bolt, a quick release pin, similar to a bicycle wheel quick release mechanism can be employed to removably attach the plate (and thereby the column) to the frame.

In another embodiment, the frame has straps or c-style clamps. These straps/clamps grasp the column and are tightened by known mechanisms, such as lever locks. In some cases, the column has one or more circumferential lips or ridges arranged above and/or below the clamps/straps that assure that the column cannot slide downwards and/or upwards.

While embodiments of the invention have been illustrated and described, as noted above, many changes can be made without departing from the spirit and scope of the invention. Accordingly, the scope of the invention is not limited by the above disclosure.

The invention claimed is:

1. A modular rack, comprising:
    a first leg having a vertical member attached to a horizontal member;
    a second leg having a vertical member attached to a horizontal member; and
    a variable width frame comprising one or more frame modules, wherein each frame module is rectilinear in shape, wherein each frame module has a left side and a right side, wherein each frame module is $W_1$ units of distance wide, wherein each side of each frame module is attachable to a side of another one of the frame modules or to a top end of the vertical member of one of the first leg or second leg,
    such that the variable width frame is configurable to provide the modular rack with a width of N units of distance by combining the first leg, second leg, and M frame modules, wherein $N=M*W_1$, wherein M is the total number of frame modules in the modular rack, and
    wherein each of the frame modules includes an upper mounting device and a lower mounting device that are each configured to removably attach an extraction column to the frame module, wherein each mounting device comprises a hole in the frame module, wherein the extraction column includes a flat plate member having a hole that is configured to be aligned with the frame hole and that is configured to receive a bolt that passes through the member hole and the frame hole, thereby removably coupling the extraction column to the frame module.

2. The modular rack of claim 1, wherein a frame module of $W_1$ units of distance is configured to carry at most $W_1$ extraction columns.

3. The modular rack of claim 2, wherein $W_1=2$ units of distance.

4. The modular rack of claim 2, wherein the variable width frame further comprises one or more frame modules that are each $W_2$ units of distance wide, wherein $W_1$ is not equal to $W_2$, wherein the variable width frame is configurable to provide the modular rack with a width of N units of distance by combining the first leg, second leg, and $M_1$ frame modules of width $W_1$ and $M_2$ frame modules of width $W_2$, wherein $N=M_1*W_1+M_2*W_2$, wherein $M_1$ is the total number of frame modules of width $W_1$ in the rack, and wherein $M_2$ is the total number of frame modules of width $W_2$ in the rack.

5. The modular rack of claim 4, wherein $W_1$=2 units of distance and $W_2$=3 units of distance.

6. The modular rack of claim 1, further comprising:
a first frame module having a width of $W_1$ units of distance;
a second frame module having a width of $W_2$ units of distance;
wherein the right side of the first frame module is removably and directly attached to a top end of the vertical member of the first leg,
wherein the left side of the first frame module is removably and directly attached to the right side of the second frame module,
wherein the left side of the second frame module is removably and directly attached to a top end of the vertical member of the second leg, such that the first frame module is attached to the second leg via the second frame module,
wherein $N=W_1+W_2$.

7. The modular rack of claim 6, wherein $W_1$=2 units of distance and $W_2$=3 units of distance.

8. The modular rack of claim 1, wherein the first leg and the second leg each include only a single diagonal support member attached at a first end to the horizontal member and at a second end to the vertical member.

9. The modular rack of claim 1, further comprising:
a first and second caster attached to the horizontal member of the first leg; and
a third and fourth caster attached to the horizontal member of the second leg.

10. A modular rack, comprising:
a first leg having a vertical member attached to a horizontal member;
a second leg having a vertical member attached to a horizontal member; and
a variable width frame comprising one or more frame modules, wherein each frame module is rectilinear in shape, wherein each frame module has a left side and a right side, wherein each side of each frame module is attachable to a side of another one of the frame modules or to a top end of the vertical member of one of the first leg or second leg,
wherein each of the frame modules includes an upper mounting device and a lower mounting device that are each configured to removably attach an extraction column to the frame module, wherein each mounting device comprises a hole in the frame module, wherein the extraction column includes a flat plate member having a hole that is configured to be aligned with the frame hole and that is configured to receive a bolt that passes through the member hole and the frame hole, thereby removably coupling the extraction column to the frame module.

11. The modular rack of claim 10, further comprising:
a first frame module; and
a second frame module;
wherein the right side of the first frame module is removably and directly attached to a top end of the vertical member of the first leg,
wherein the left side of the first frame module is removably and directly attached to the right side of the second frame module,
wherein the left side of the second frame module is removably and directly attached to a top end of the vertical member of the second leg, such that the first frame module is attached to the second leg via the second frame module.

12. A modular rack, comprising:
a first leg having a vertical member attached to a horizontal member;
a second leg having a vertical member attached to a horizontal member; and
a variable width frame comprising one or more frame modules, wherein each frame module is rectilinear in shape, wherein each frame module has a left side and a right side, wherein each side of each frame module is attachable to a side of another one of the frame modules or to a top end of the vertical member of one of the first leg or second leg,
wherein each of the frame modules includes an upper mounting device and a lower mounting device that are each configured to removably attach an extraction column to the frame module, wherein each mounting device comprises a hole in the frame module that is configured to receive a threaded post welded to a corresponding extraction column, wherein the threaded post is secured to the frame by way of a nut.

13. The modular rack of claim 12, further comprising:
a first frame module; and
a second frame module;
wherein the right side of the first frame module is removably and directly attached to a top end of the vertical member of the first leg,
wherein the left side of the first frame module is removably and directly attached to the right side of the second frame module,
wherein the left side of the second frame module is removably and directly attached to a top end of the vertical member of the second leg, such that the first frame module is attached to the second leg via the second frame module.

14. The modular rack of claim 12, wherein the first leg and the second leg each include only a single diagonal support member attached at a first end to the horizontal member and at a second end to the vertical member.

15. The modular rack of claim 12, further comprising:
a first and second caster attached to the horizontal member of the first leg; and
a third and fourth caster attached to the horizontal member of the second leg.

* * * * *